US008726581B2

(12) United States Patent
Zimmerman et al.

(10) Patent No.: US 8,726,581 B2
(45) Date of Patent: May 20, 2014

(54) CONSTRUCTION SYSTEM PROVIDING STRUCTURAL INTEGRITY WITH INTEGRAL SEAL

(75) Inventors: Steven Zimmerman, Linden, AL (US);
Van T. Walworth, Lebanon, TN (US);
Scott Drummond, Tuscaloosa, AL (US)

(73) Assignee: SR Systems, LLC, Tuscaloosa, AL (US)

( * ) Notice: Subject to any disclaimer, the term of this patent is extended or adjusted under 35 U.S.C. 154(b) by 0 days.

(21) Appl. No.: 13/613,441

(22) Filed: Sep. 13, 2012

(65) Prior Publication Data

US 2013/0067837 A1 Mar. 21, 2013

Related U.S. Application Data

(60) Provisional application No. 61/685,793, filed on Mar. 26, 2012, provisional application No. 61/573,943, filed on Sep. 15, 2011.

(51) Int. Cl.
*E04B 7/04* (2006.01)

(52) U.S. Cl.
USPC .............................. 52/92.2; 52/698; 52/293.3

(58) Field of Classification Search
USPC .............. 52/698, 90.1, 92.1, 93.1, 92.2, 93.2, 52/293.3, 223.13, 167.1, 94, 302.1, 199, 52/202, 203
See application file for complete search history.

(56) References Cited

U.S. PATENT DOCUMENTS

| | | | | |
|---|---|---|---|---|
| 3,668,828 A | * | 6/1972 | Nicholas et al. | 52/92.1 |
| 3,755,982 A | * | 9/1973 | Schmidt | 52/295 |
| 3,785,108 A | * | 1/1974 | Satchell | 52/645 |
| 3,902,280 A | * | 9/1975 | Spoar et al. | 52/91.1 |
| 3,963,210 A | * | 6/1976 | Macklin | 249/210 |
| 3,964,268 A | * | 6/1976 | DiPeri | 62/121 |
| 4,073,103 A | * | 2/1978 | McClure | 52/93.1 |
| 4,321,776 A | * | 3/1982 | Delight | 52/167.1 |
| 4,420,913 A | * | 12/1983 | Long et al. | 52/57 |

(Continued)

FOREIGN PATENT DOCUMENTS

| | | | | |
|---|---|---|---|---|
| JP | 04327627 A | * | 11/1992 | ............... E04B 7/06 |
| JP | 06-306944 | | 11/1994 | |
| JP | 2009-293214 | | 12/2009 | |

OTHER PUBLICATIONS

International Search Report for PCT/US2013/033936 mailed Jul. 18, 2013.

(Continued)

*Primary Examiner* — Brent W Herring
(74) *Attorney, Agent, or Firm* — Harness, Dickey & Pierce, P.L.C.

(57) ABSTRACT

A system for constructing a residential or commercial structure and/or retrofitting an existing structure provides a series of construction components employed that cooperate with standard construction materials to enhance the building structural integrity when subjected to destructive wind forces such as those commonly associated with hurricanes and tornados. The resultant strength of the structure is increased beyond what the standard construction materials were capable of on their own. The enhanced components further cooperate with standard construction materials to provide a secondary water sealing ability such that the typical veneer coverings of siding and/or shingles, which are typically required to provide a primary sealing system from water influent to the structure, are relegated to the role of cosmetics for the structure. The primary sealing ability of the shingles and/or the siding can be compromised in response to storm winds, yet the structure will remain watertight via the secondary sealing system.

9 Claims, 13 Drawing Sheets

(56) References Cited

U.S. PATENT DOCUMENTS

| | | | |
|---|---|---|---|
| 4,455,792 A * | 6/1984 | Pasco | 52/93.2 |
| 4,872,298 A | 10/1989 | Klemic | |
| 4,875,314 A * | 10/1989 | Boilen | 52/167.1 |
| 4,890,436 A * | 1/1990 | Colonias | 52/643 |
| 4,982,545 A * | 1/1991 | Stromback | 52/639 |
| 5,050,364 A | 9/1991 | Johnson et al. | |
| 5,060,436 A | 10/1991 | Delgado | |
| 5,240,224 A | 8/1993 | Adams | |
| 5,317,850 A | 6/1994 | Colonias et al. | |
| 5,327,699 A * | 7/1994 | Khan et al. | 52/93.2 |
| 5,384,993 A * | 1/1995 | Phillips | 52/92.2 |
| 5,388,804 A | 2/1995 | Cohen et al. | |
| 5,448,861 A * | 9/1995 | Lawson | 52/92.2 |
| 5,487,244 A * | 1/1996 | Hill | 52/202 |
| 5,491,935 A | 2/1996 | Coxum | |
| 5,699,639 A * | 12/1997 | Fernandez | 52/707 |
| 5,836,132 A | 11/1998 | Weathersby | |
| 5,881,501 A * | 3/1999 | Guffey et al. | 52/90.1 |
| 6,003,271 A * | 12/1999 | Boyer et al. | 52/79.5 |
| 6,014,843 A * | 1/2000 | Crumley et al. | 52/167.3 |
| 6,065,730 A | 5/2000 | Marks et al. | |
| 6,161,339 A * | 12/2000 | Cornett et al. | 52/23 |
| 6,256,960 B1 * | 7/2001 | Babcock et al. | 52/592.1 |
| 6,347,916 B1 | 2/2002 | Ramirez | |
| 6,367,205 B2 * | 4/2002 | Cornett, Sr. | 52/23 |
| 6,430,881 B1 * | 8/2002 | Daudet et al. | 52/92.2 |
| 6,691,488 B2 * | 2/2004 | Branson | 52/745.01 |
| 6,763,634 B1 * | 7/2004 | Thompson | 52/92.2 |
| 6,843,027 B2 * | 1/2005 | Gaddie et al. | 52/92.1 |
| 6,922,968 B1 | 8/2005 | Behlen | |
| 7,103,984 B2 | 9/2006 | Kastberg | |
| 7,140,155 B1 * | 11/2006 | Nasimov | 52/236.8 |
| 7,150,132 B2 * | 12/2006 | Commins | 52/293.3 |
| 7,174,689 B2 | 2/2007 | Alyea et al. | |
| 7,200,972 B1 * | 4/2007 | Freeman et al. | 52/641 |
| 7,398,620 B1 * | 7/2008 | Jones | 52/92.2 |
| 7,445,192 B2 | 11/2008 | Gridley et al. | |
| 7,448,172 B1 | 11/2008 | Knodel | |
| 7,665,257 B2 * | 2/2010 | Posey | 52/223.13 |
| 7,788,878 B1 * | 9/2010 | diGirolamo et al. | 52/745.19 |
| 7,874,124 B2 * | 1/2011 | Posey | 52/745.19 |
| 7,891,110 B2 | 2/2011 | Diaz | |
| 7,971,411 B2 * | 7/2011 | Commins | 52/745.21 |
| 8,065,846 B2 * | 11/2011 | McDonald et al. | 52/281 |
| 8,091,291 B2 * | 1/2012 | Ode | 52/93.1 |
| 2003/0024174 A1 | 2/2003 | Bonds et al. | |
| 2003/0182875 A1 * | 10/2003 | Hill | 52/92.1 |
| 2004/0049993 A1 * | 3/2004 | Saldana | 52/90.2 |
| 2006/0254166 A1 * | 11/2006 | Michels et al. | 52/270 |
| 2006/0254167 A1 | 11/2006 | Antonic | |
| 2010/0236158 A1 * | 9/2010 | Carbonaro | 52/92.1 |
| 2013/0000235 A1 * | 1/2013 | Espinosa et al. | 52/293.3 |
| 2013/0067839 A1 * | 3/2013 | Zimmerman et al. | 52/293.3 |

OTHER PUBLICATIONS

Written Opinion of the International Searching Authority for PCT/US2013/033936 mailed Jul. 18, 2013.
International Search Report for PCT/US2012/055809 mailed Feb. 21, 2013.
Written Opinion of the International Searching Authority for PCT/US2012/055809 mailed Feb. 21, 2013.

* cited by examiner

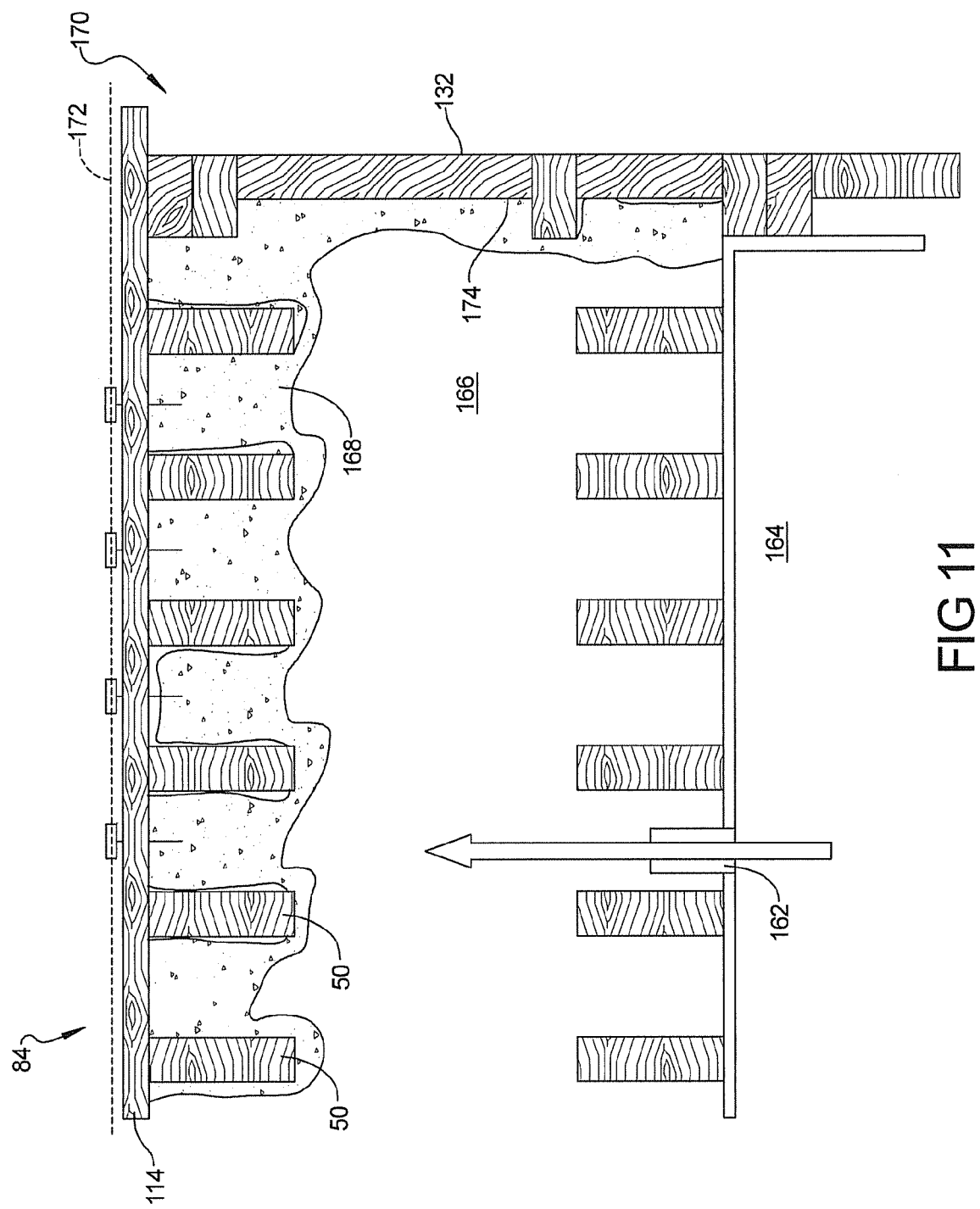

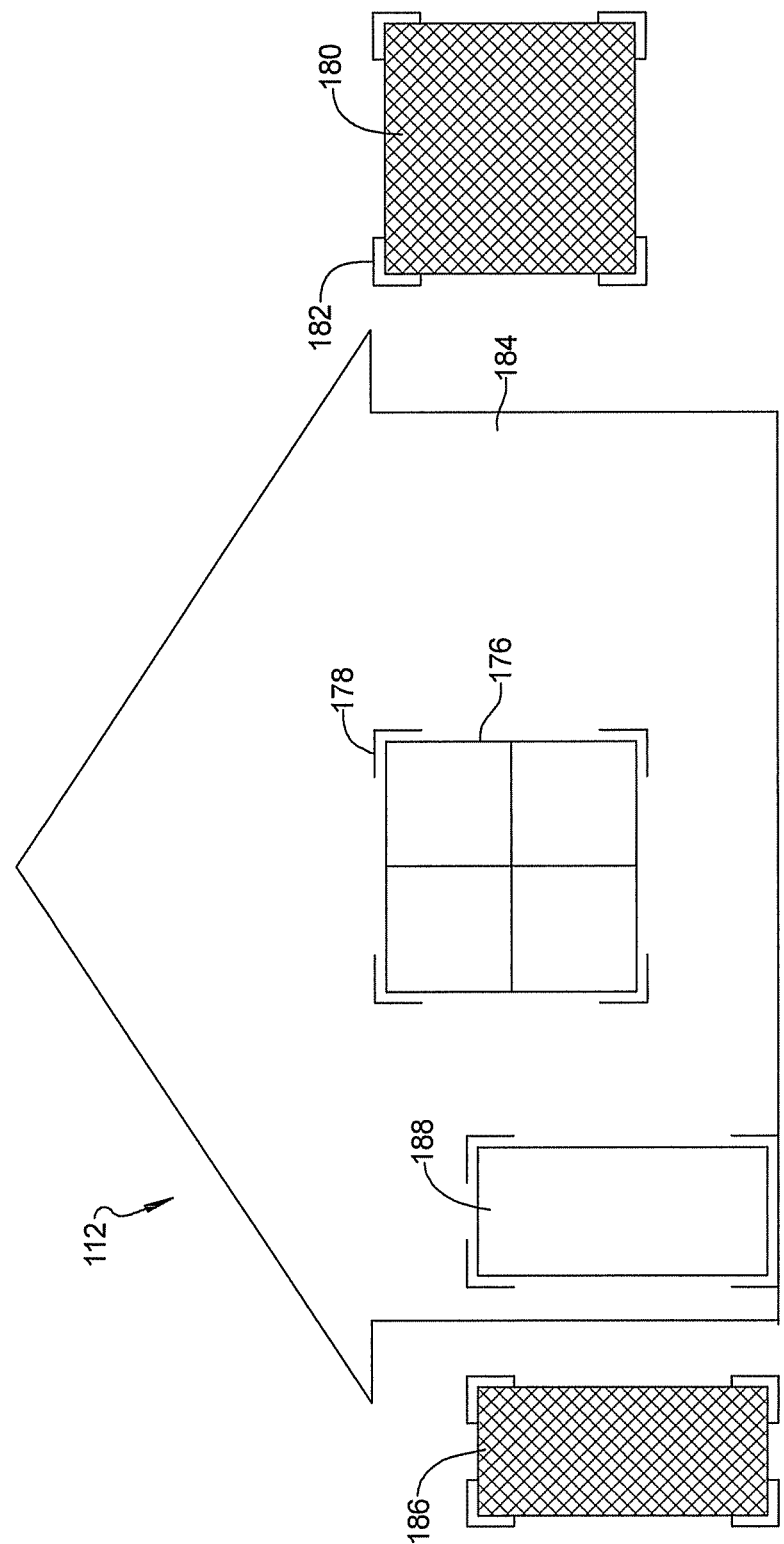

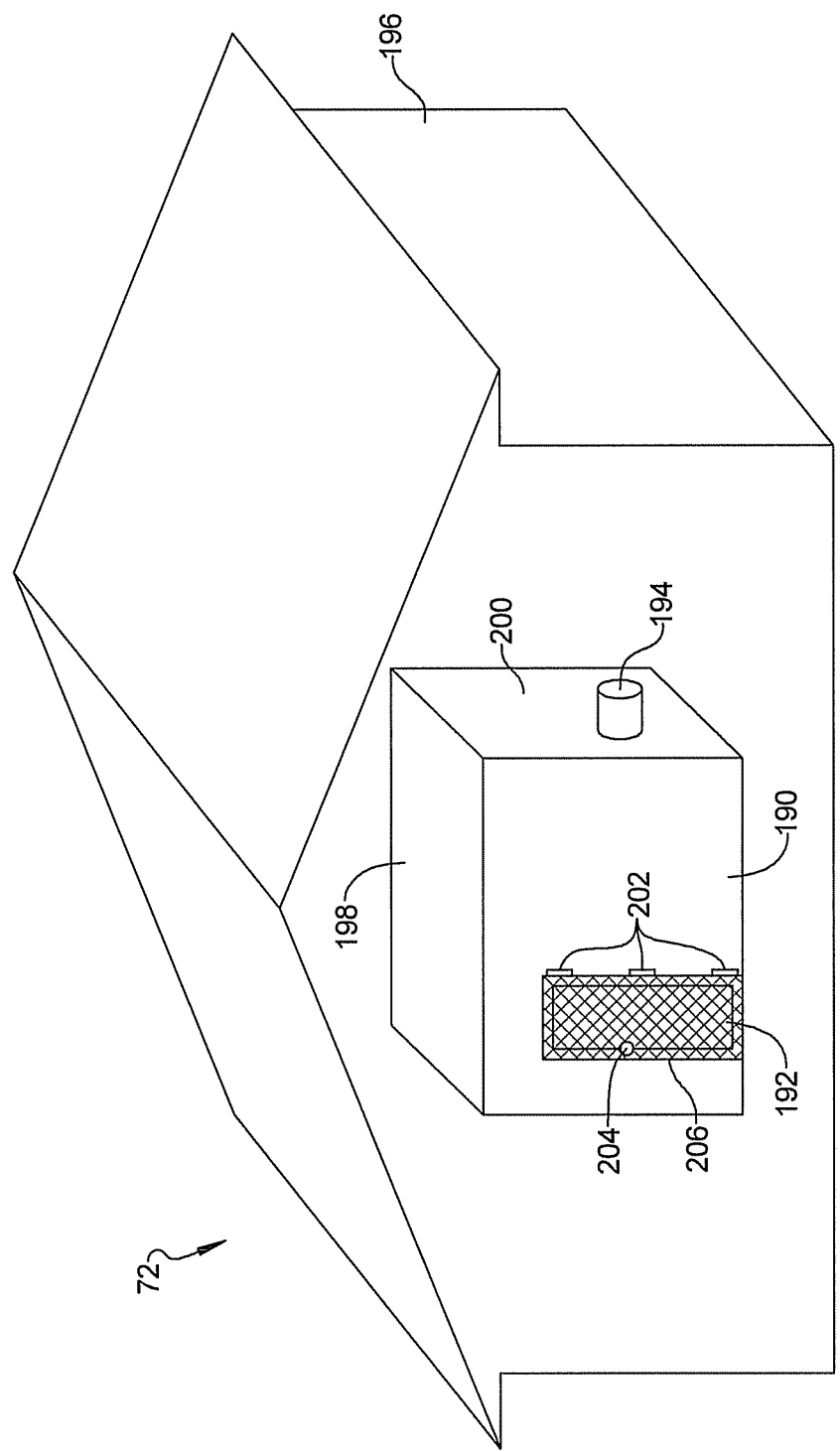

CONSTRUCTION SYSTEM PROVIDING STRUCTURAL INTEGRITY WITH INTEGRAL SEAL

CROSS-REFERENCE TO RELATED APPLICATIONS

This application claims the benefit of U.S. Provisional Application No. 61/685,793, filed on Mar. 26, 2012, which claims the benefit of U.S. Provisional Application No. 61/573,943, filed on Sep. 15, 2011. The entire disclosure of the above application is incorporated herein by reference.

FIELD

The present disclosure relates to storm resistant components and residential or commercial structures enhanced to survive storm winds and rain.

BACKGROUND

This section provides background information related to the present disclosure which is not necessarily prior art.

It is well known that hurricanes and tornados create storm wind forces capable of damaging and/or destroying standard residential and commercial constructions. Wind storm forces are known to remove and/or compromise the primary sealing systems of shingles, roofing, siding, and veneers. Furthermore, wind storm forces are well known to lift off entire roof systems and blow down and/or suck out walls.

In addition, wind storm forces are well known to impose substantial blowing rain events which become influent to structures even before the construction components fail and/or are compromised. Beyond the obvious influent opportunities resulting from broken windows and/or other compromised construction components, wind storm events are known to blow rain into and through functioning vents of an intact roof system, thus creating water damage even though little or no actual structural damage occurs.

There are numerous representatives of known art resident in the patent records that deal with various hurricane or tornado storm wind forces by claiming use of any one of several strengthening components. However, one of the major problems with all of the known examples is that they do not lend themselves to our do-it-yourself culture and do not lend themselves to be cost effective for the mass consumption public at large.

Another problem with known art examples is that none of these patent records for structural strengthening systems includes a means to provide a secondary sealing system for the structure in the event the primary sealing system of shingles and/or siding of the structure are compromised.

There are some references of known art in the patent records related to systems that minimize water influent damage from wind storms, but once again, none of these examples lend themselves to our do-it-yourself culture and do not lend themselves to be cost effective for the mass consumption public at large. In addition, none of the known examples provide any strengthening enhancements to improve the structural integrity of the construction. Furthermore, none of these prior art sealing systems provides a secondary sealing system in the event that the primary sealing system is compromised.

SUMMARY

This section provides a general summary of the disclosure, and is not a comprehensive disclosure of its full scope or all of its features.

The subject invention overcomes well-known problems in such a way that those skilled in the art will readily recognize and appreciate. Furthermore, the present invention provides features and capabilities for many other applications beyond the preferred embodiments disclosed, which those skilled in the art will readily recognize also embody the spirit of the subject invention.

One preferred embodiment of the subject invention relates to a typical residential stick-built or prefabricated home construction which is enhanced and substantially strengthened in specific areas of the structure to better withstand the destructive wind forces of hurricanes and tornados. One preferred embodiment also provides a secondary watertight seal which is utilized to maintain a reasonable barrier from influent storm water and blowing rain in the event that the primary water barrier via the shingles and/or siding is compromised during the storm.

It is understood that the secondary water seal requires that the structure must maintain a reasonable structural integrity; therefore, a series of structural enhancements are employed for this purpose and to further maintain structure integrity against storm wind forces. The structural enhancement system is comprised of several subsystems which all work together to collectively enhance the structural integrity of the structure. These subsystems include but are not limited to the following:

Anchoring System
Wall Reinforcement System
Rafter/Joist Tie-Down System
Wind-Beam System
Diaphragm Reinforcement System
Wall Sheeting System
Roof Decking System
Venting System
Window/Door Protective Seal System
Safe Room System Those skilled in the art will readily understand that while many typical structures will require all of the listed subsystems to enhance the structure adequately against storm winds, some complex structures may require additional specialized subsystems, while less complex structures may only require a partial list of the subsystems. A brief description of each subsystem follows.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 11 is a cross sectional end elevational view modified from FIG. 10 to show a venting system;

FIG. 12 is a front elevational schematic view of a building window/door protective seal system; and FIG. 13 is a front left perspective view of the building of FIG. 12 modified to include an interior storm safe room.

Corresponding reference numerals indicate corresponding parts throughout the several views of the drawings.

DETAILED DESCRIPTION

Example embodiments will now be described more fully with reference to the accompanying drawings.

Figure 1:
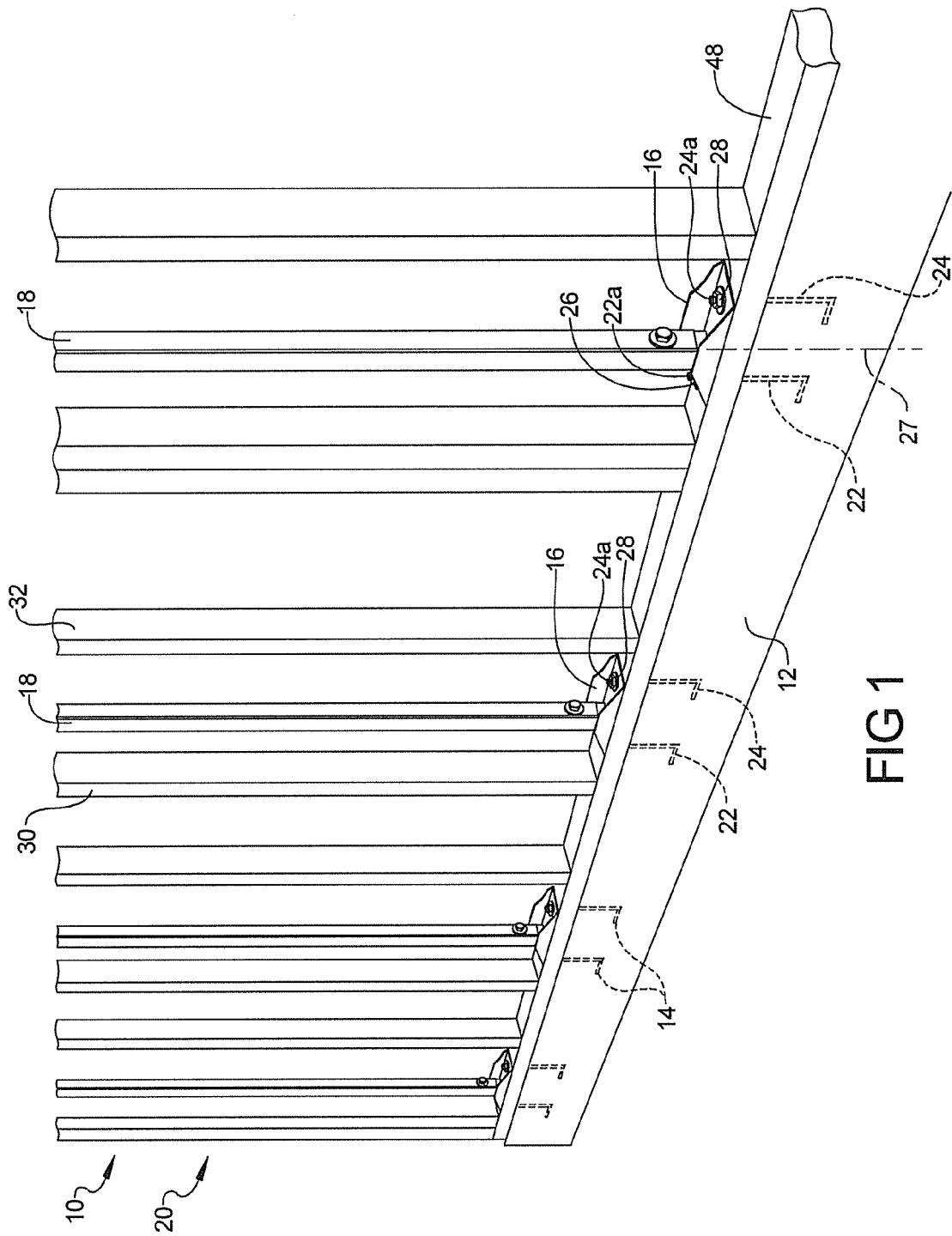
FIG. 1 is a front left perspective view of a building structure anchoring system.

Referring to FIG. 1, an anchoring system 10 connected to a typical slab 12 defining a foundation construction includes anchor bolt sets 14 at least partially embedded in the slab 12 connected to a wall reinforcement system having multiple anchor brackets 16, and multiple specialized structural members or structural columns 18 connected to the anchor brackets 16. The anchoring system 10 as defined by the subject invention is a subsystem that anchors a building structure 20 to the slab 12 or other foundational elements. One preferred embodiment enhancement system provides specialized first and second anchor bolts 22, 24 to provide proper placement and anchoring means to cooperate with other structural enhancement components. An alternative preferred embodiment employs standard anchor bolt components. Whether using specialized anchor bolts 22, 24 or standard anchor bolts, the present invention requires that appropriate anchor means include anchor bolt nuts 26, 28 connecting to freely extending portions 22a, 24a of the specialized anchor bolts 22, 24 to the anchor brackets 16, which are positioned between sequentially spaced apart members such as studs 30, 32, are employed with new construction slabs 12 being poured, preexisting slabs, and for construction or retrofit of structures on top of crawl space walls or basement walls. The freely extending portions 22a, 24a of the anchor bolts 22, 24 for each anchor bracket 16 are oppositely positioned with respect to a longitudinal axis 27 of the structural column 18 connected to each anchor bracket 16 to resist axial rotation/twisting of the structural columns 18 and thereby to resist axial rotation/twisting of the studs 30, 32. The present invention unitizes the anchoring system 10 to cooperate and integrate the respective features of a wall reinforcement system 34 (shown and described in reference to FIGS. 2-3) and/or a safe room system 72 (shown and described in reference to FIG. 13).

Referring to FIG. 2 and again to FIG. 1, the wall reinforcement system 34 as defined by the present invention is a subsystem which integrates into a typical stud type wall construction 36 of building structure 20 to provide significant enhanced compression and tension strength to the wall construction 36. A typical wood or metal stud built wall 38 having sequentially spaced studs 30, 32 may have appropriate compressive strength but it has very little tension strength, and therefore is susceptible to lift forces during storm winds. In addition, the wall reinforcement system 34 of the subject invention provides resistance to forces that result in torsion and/or rhombus conditions. The specialized structural member or structural column 18 is a metal tube installed in the stud wall 38 at intervals between adjacent ones of the studs along the wall 38 and/or at wall corners 40 such that the structural member 18 is substantially stronger than the typical stud wall components, such as wood or metal studs, and is capable of being firmly and strongly attached to the anchoring system 10 described in reference to FIG. 1. According to one embodiment sheeting 42 is bolted to the specialized wall member 18 which is anchored to the foundation slab 12 and bolted through a double top plate 44 to the rafter/joist tie-down system 46. The wall reinforcement system 34 provides a strong and solid connection from a bottom plate 48 of the stud wall 38 all the way to the top plate 44 of the stud wall 38, where it is again firmly and solidly attached and terminated.

Figure 2:
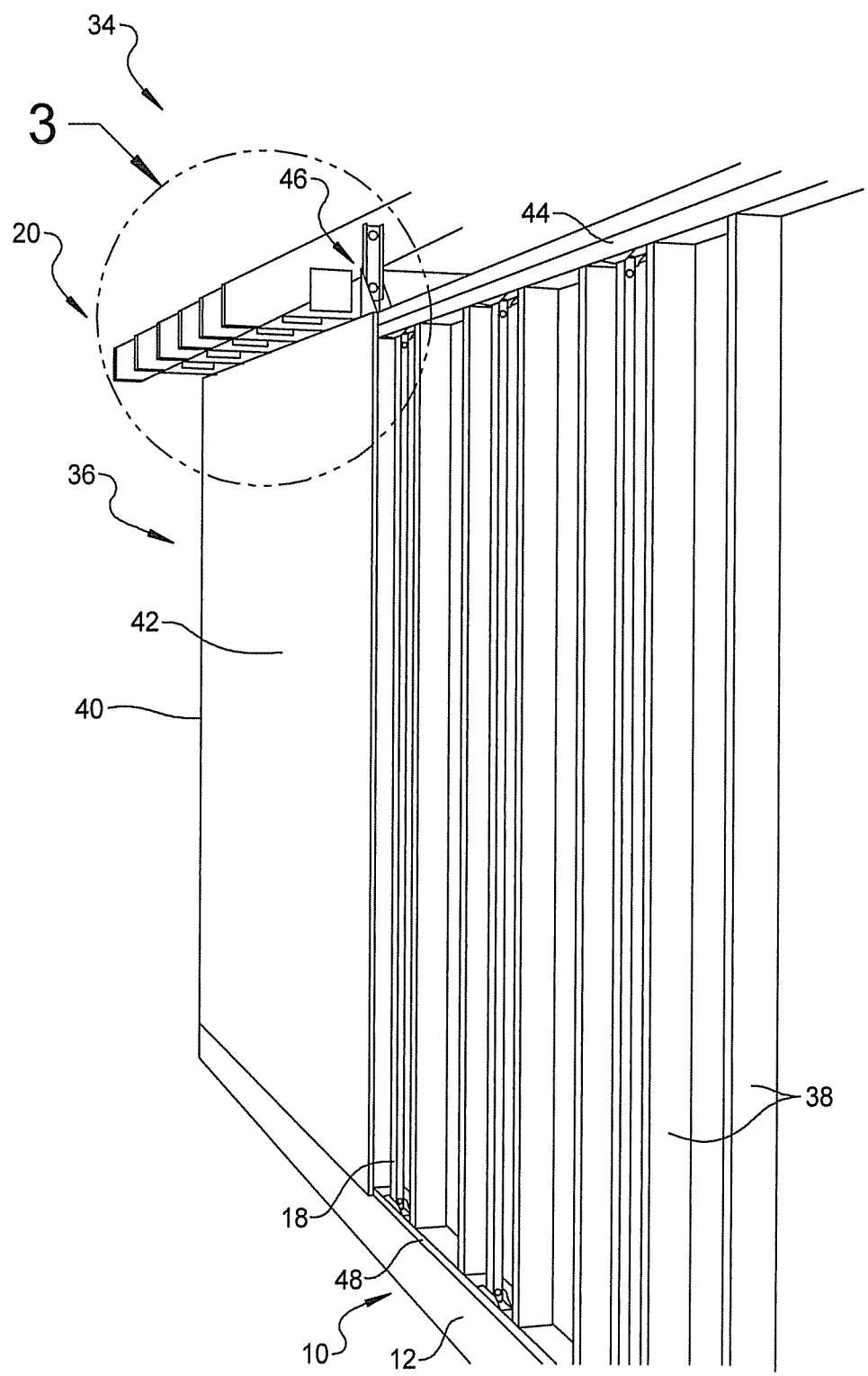
FIG. 2 is a front left perspective view of the building structure of FIG. 1, further including a wall reinforcement system.

Referring to FIG. 3 and again to FIGS. 1-2, according to one embodiment, the structural column 18 is bolted through the top plate 44 of the wall 38 to roof elements 50, 52, such as the upper and lower chords of a roof truss or the rafters and ceiling joists of a common roof system. The wall reinforcement system 34 ties together the roof components, the wall components, and the foundation using the structural columns 18 fastened/bolted at opposite ends to building structure.

Figure 3:
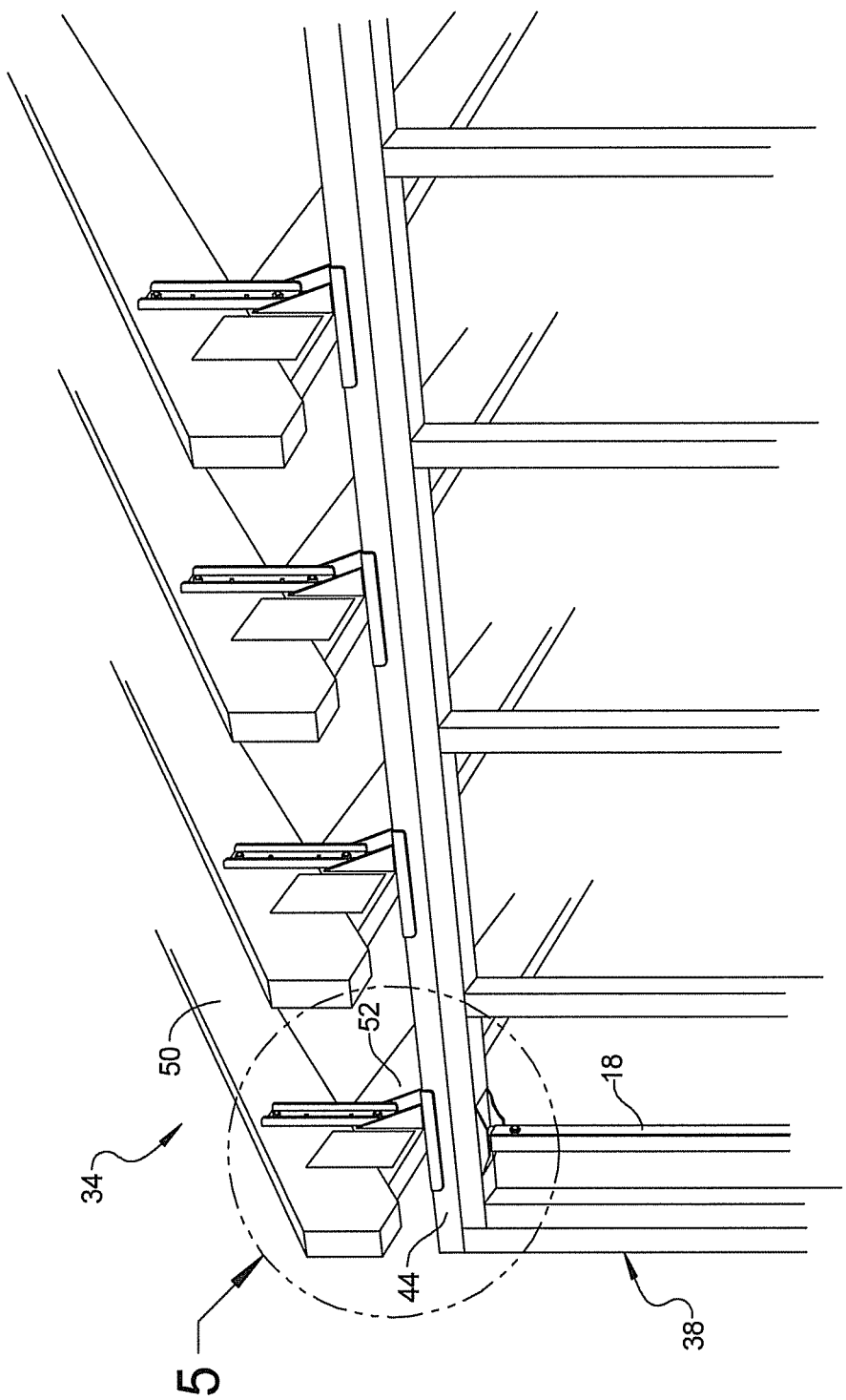
FIG. 3 is a front left perspective view of area 3 of FIG. 2.
Figure 4:
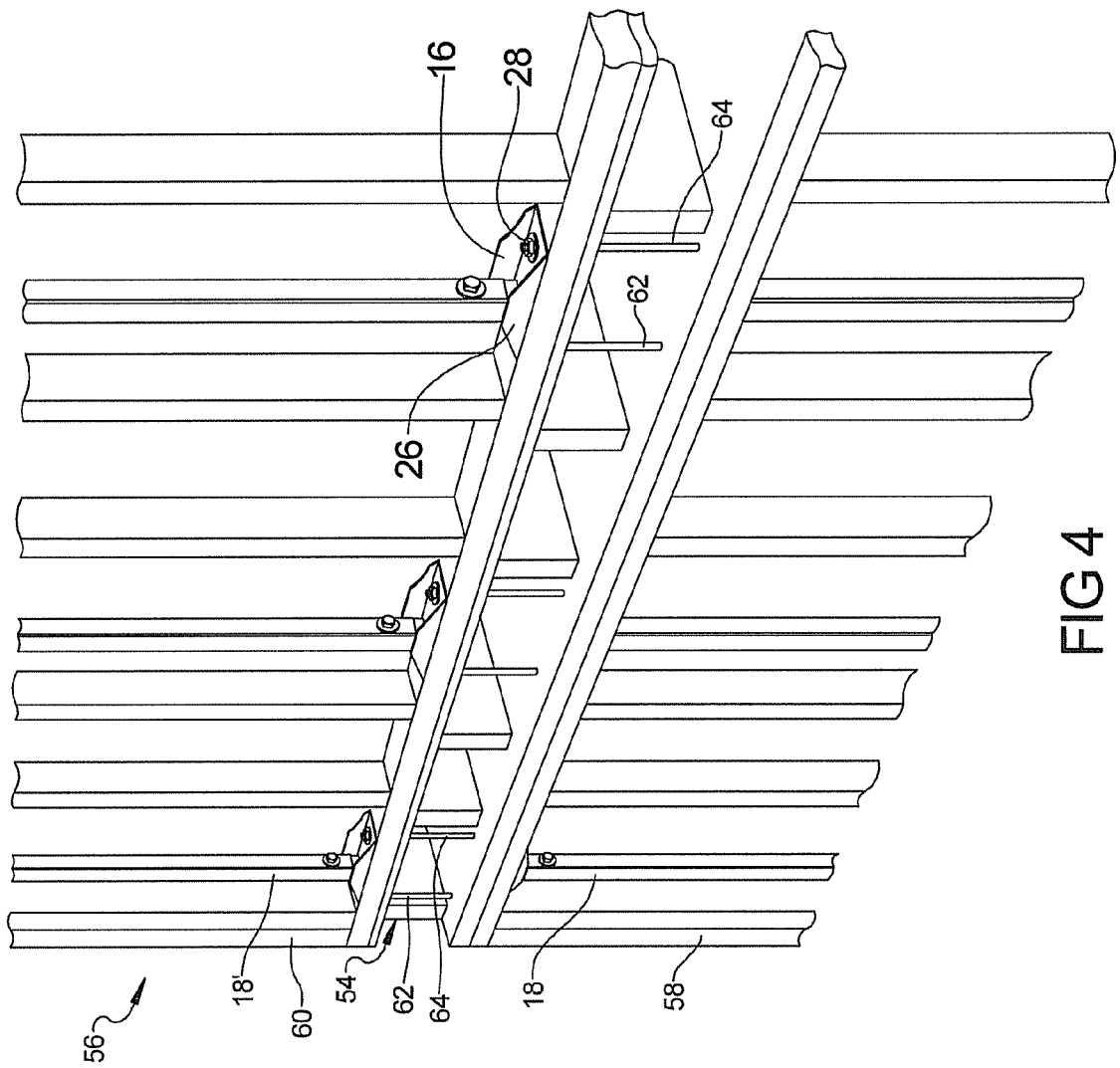
FIG. 4 is a front left perspective view of a portion of the building structure of FIG. 1, modified to show upper and lower structure joined by floor joists.
Figure 7:
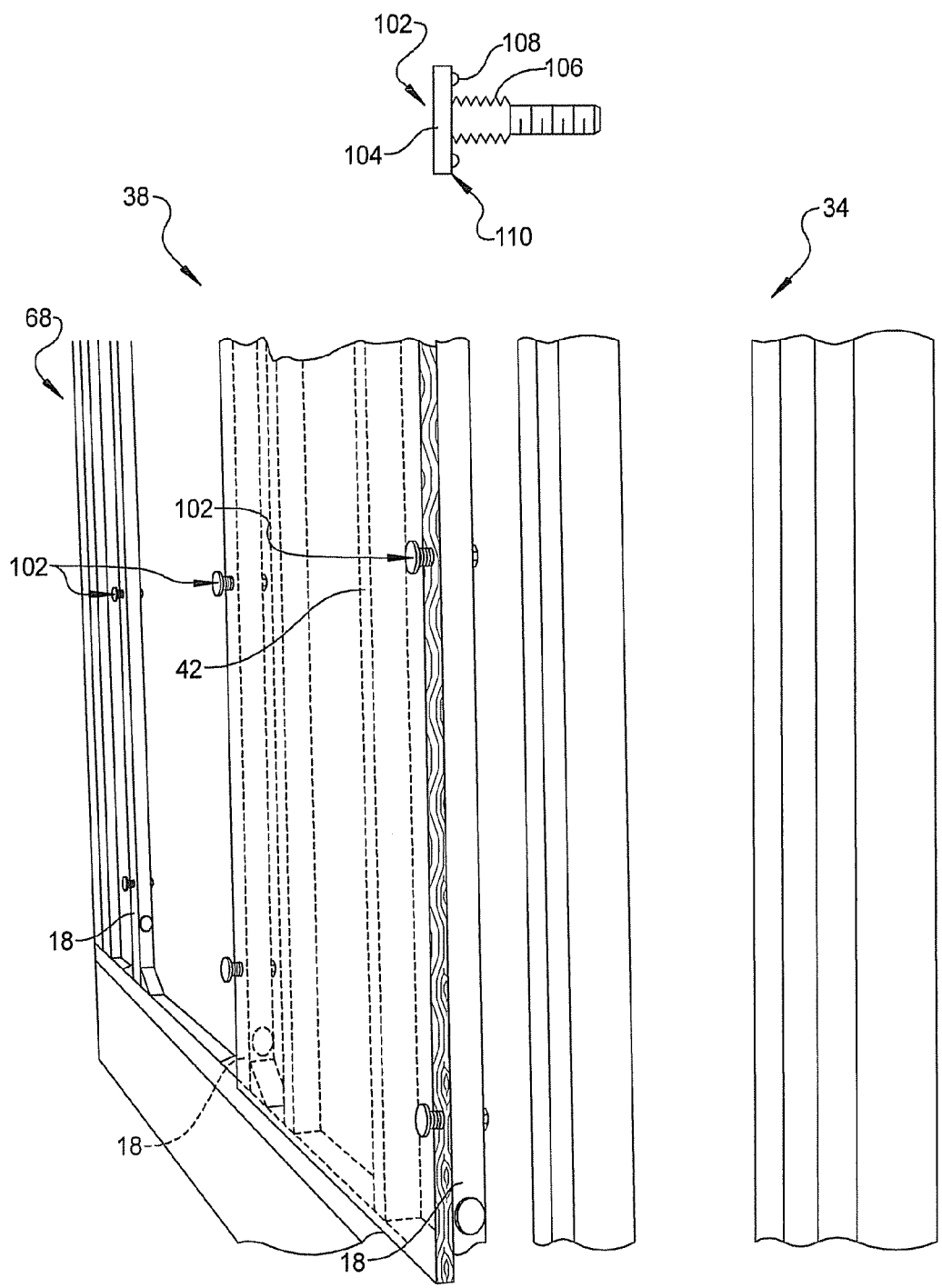
FIG. 7 is a front left perspective view of the building structure similar to FIG. 2, further including a wall sheeting system.

Referring to FIG. 4 and again to FIGS. 1-3, the present invention also applies to multi-story structures by employing bolted connections across a floor joist construction 54 of a multi-story wall construction 56 wherein wall reinforcement columns 18, 18' on lower and upper floors 58, 60 are bridged and connected via bolted connectors 62, 64 across the floor joist construction 54. The present invention effectively unitizes the entire wall construction 56 by employing the wall reinforcement system 34 to cooperate and integrate the respective features of the anchoring system 10 and a rafter/joist tie-down system 66 (which is shown and described in reference to FIG. 5) and with a wall sheeting system 68 (which is shown and described in reference to FIG. 7) and with a diaphragm reinforcement system 70 (which is shown and described in reference to FIG. 10) and/or a safe room system 72 (which is shown and described in reference to FIG. 13).

Referring to FIG. 5 and again to FIGS. 1-4, the rafter/joist tie-down system 66 as defined by the subject invention is a firmly and strongly attached means to effectively connect the upper chords or rafters 50 and the lower chords or ceiling joists 52 to the top plate 44 of the stud wall 38 and more importantly directly to the wall reinforcement system 34. The rafter/joist tie-down system 66 also provides a strong connection means at each crossing point on outside walls and inside walls, for every rafter 50 and/or joist 52 whether it is connected directly to or indirectly connected to a member 18 of the wall reinforcement system 34.

Figure 5:
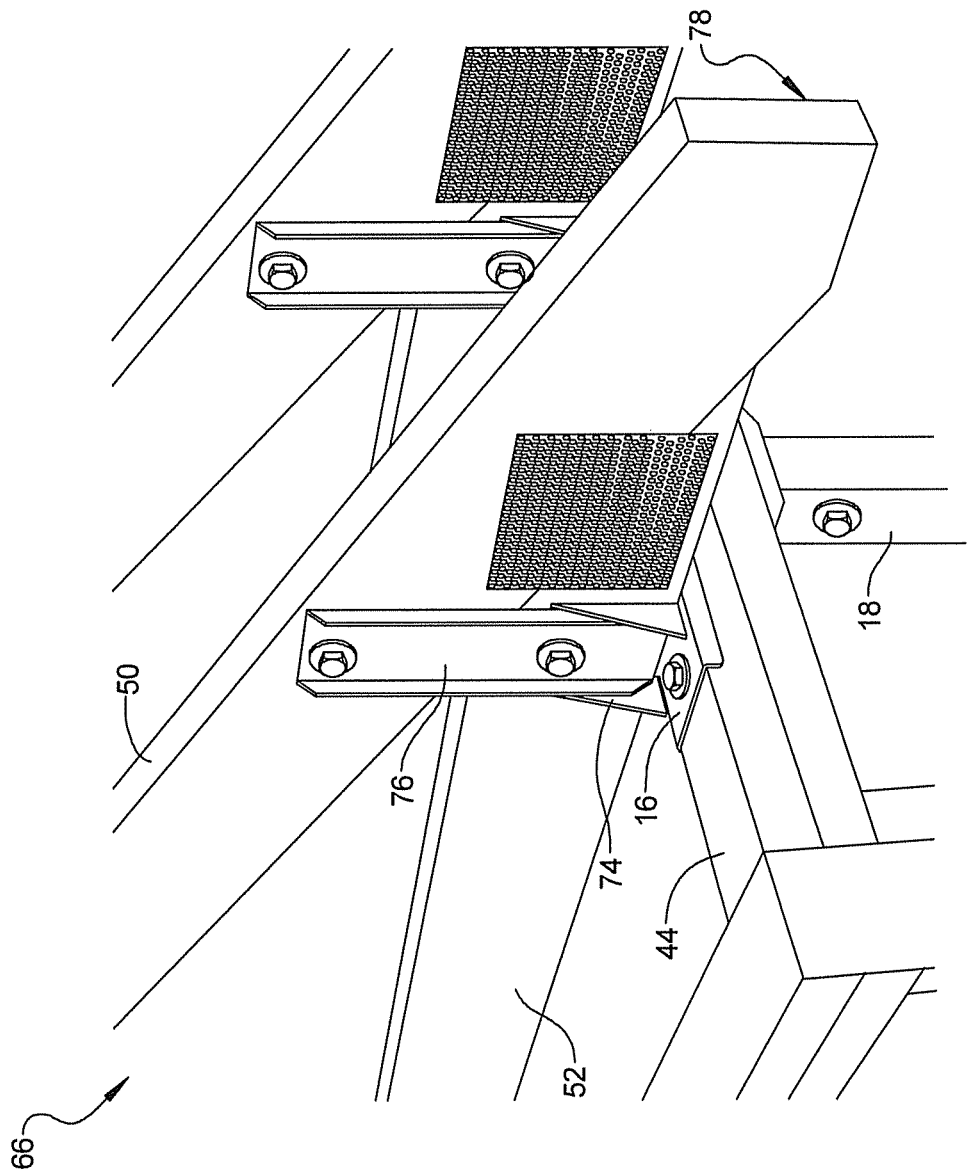
FIG. 5 is a front right perspective view of area 5 of FIG. 3.

Referring to FIG. 5, each wall reinforcement member or structural column 18 is bolted to a rafter tie-down connector 74. A typical truss example is provided wherein a rafter tie-down extension 76 spans between the lower chord 52 and upper chord 50 of a truss 78. The rafter/joist tie-down system 66 also resists rafters 50 and/or joists 52 from being compromised due to lift forces generated by storm wind forces. The rafter/joist tie-down system 66 also resists rafters 50 and/or joists 52 from being easily twisted due to torsion forces and/or rhombus forces which enhances the relative strength of the structure to resist shear forces acting upon the structure as a result of strong straight line winds or tornadic vortexes. Testing and research has demonstrated and taught that the best roof pitch for storm wind resistance is about a 15 degree angle off a horizontal plane, and that a hip roof construction is more storm-worthy than a gable end construction, and further that less roof overhang is better than long extended roof overhang construction.

Figure 8:
FIG. 8 is a front left perspective view of a roof decking system.

The present invention and rafter/joist tie-down system 66 is able to enhance standard roof construction that exploits the known research and yet still provides some enhancements for other roof constructions that do not conform to the prior art research for best storm construction. The subject invention effectively unitizes the entire roof system by employing the features of the rafter/joist tie-down system 66 to cooperate and integrate with the respective features of the wall reinforcement system 34 and a wind-beam system 80 (shown and described in reference to FIG. 6), a roof decking system 82 (shown and described in reference to FIG. 8), a venting system 84 (shown and described in reference to FIG. 11), the diaphragm reinforcement system 70, and/or the safe room system 72.

Figure 6:
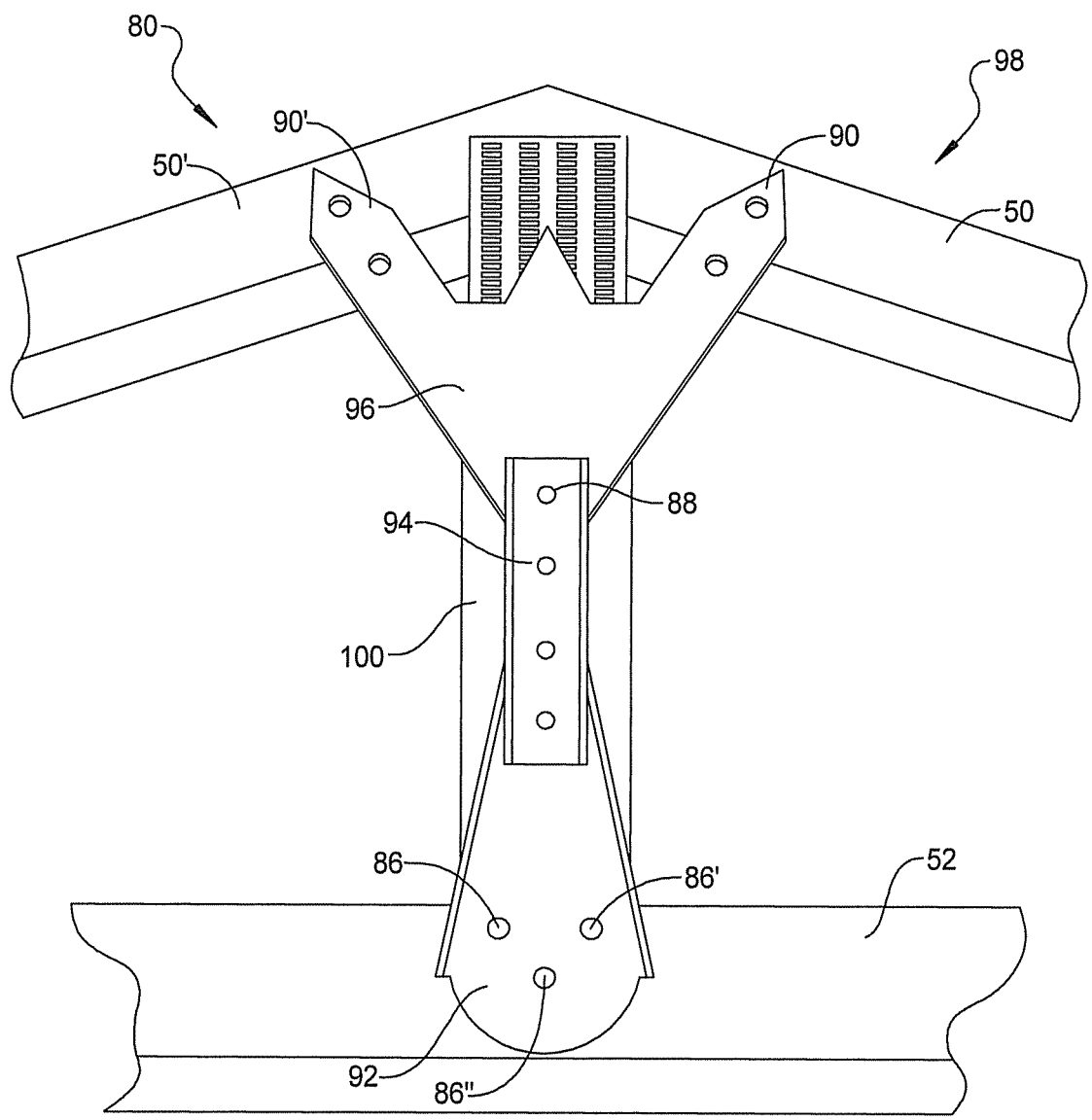
FIG. 6 is a bottom front perspective view of a truss assembly.

Referring to FIG. 6, the wind-beam system 80 as defined by the subject invention is a series of reinforcement components employed at the connections of rafters 50, 50' and trusses 52 to enhance the structural integrity of the rafters and trusses. A typical truss 52 is enhanced at connection points 86, 88, 90 with wind-beam components including in several preferred embodiments a wind-beam chord connector 92, a wind-beam extension 94, and a wind-beam ridge connector 96. The wind-beam chord connector 92 is a metal member connecting the joist 52 to an angularly oriented joining member, which according to several aspects is a transversely oriented center gable end stud or kingpost 100. The wind-beam ridge connector 96 is a metal plate connecting the kingpost 100 to both of the upper chords or rafters 50, 50'. The wind-beam extension 94 is a metal U-channel that can be used to connect the wind-beam chord connector 92 to the wind-beam ridge connector 96. Typical construction techniques for rafters 50 and trusses 52 include nail plates and individual nails at connection points. During storm wind conditions, one side of the roof is considered the windward side if the wind is blowing directly toward that roof section. As a result, the forces acting upon the roof place it compression. In contrast, the opposite side of the roof is referred to the leeward side and creates lifting force acting on this portion of the roof. As a result, the combination of one side of the roof pressing down simultaneously as the other side is trying to lift off invites significant structural damage at relatively low force values.

The wind-beam system 80 effectively reinforces roof rafters 52 and/or trusses 98 together with strong and securely fastened members such as the wind-beam chord connector 92, wind-beam extension 94, and wind-beam ridge connector 96, which effectively unitizes the entire roof system together to act more as a unit than as individual roof components. The wind-beam system 80 works on traditional rafter systems and/or traditional truss systems. Those skilled in the art will appreciate that the steeper the roof pitch, the greater the lift forces on the leeward side, and thus the stronger the wind-beam system 80 effectively needs to be, all things being equal. The subject invention effectively unitizes the entire roof system by employing the features of the wind-beam system 80 to cooperate and integrate with the respective features of the rafter/joist tie-down system 66 and the roof decking system 82, the venting system 84, the diaphragm reinforcement system 70, and/or the safe room system 72.

Referring to FIG. 7 and again to FIGS. 1-6, the wall sheeting system 68 as defined by the subject invention provides an improved method of covering and sealing the exterior walls 38 of the structure prior to applying additional façade or other cosmetic coverings such as vinyl siding, brick, et cetera. Wall sheeting 42, such as plywood, is bolted to the wall reinforcement structural columns 18 using bolts 102. The wall sheeting system 68 provides an improved fastening method by bolting the sheeting 42 to the wall reinforcement system 34, which ensures that the sheeting 42 will remain securely in place when the structure is exposed to storm wind forces. Because the wall sheeting system 68 stays securely in place during storm wind forces, it is enabled to provide a secondary water seal for the wall 38 to resist rain and blowing rain in the event that the primary covering and weather seal façade is compromised and/or lost during storm winds subjected upon the structure. One preferred embodiment of the subject invention includes a specialized bolted fastener 102 featuring an enlarged flat head 104 with barbs 106 which seat into the sheeting 42 and includes a sealing ring rib 108 on the underside 110 of the enlarged head 104 to securely and firmly hold and maintain a watertight seal. In appropriate applications, the wall sheeting system 68 is incorporated into the safe room system 72 such that requirements for resisting penetrations from airborne debris are accomplished. The subject invention effectively unitizes the entire wall construction by employing the features of the wall sheeting system 68 to cooperate and integrate with the respective features of the wall reinforcement system 34 and a window/door protective seal system 112 (shown and described with respect to FIG. 12), and the safe room system 72.

Those skilled in the art will also recognize that alternative bolted fastening methods exist for attaching the sheeting to the structural column such as tapped holes in the structural column 18 to receive a bolt. Another bolted alternative includes the use of a standard nut clipped or attached to the structural column 18 to receive a bolt. A further bolted method for fastening the sheeting to the structural column 18 includes any one of several self-tapping screws. Still another fastening method includes using a bracket that bolts to the sheeting and separately bolts to the structural column 18. Any of these bolted fastening methods will satisfy the spirit of securing the sheeting directly to the structural column. It will also be appreciated that the bolted fasteners may require a large head and/or a washer device to prevent the head of the fastener from pulling through the sheeting when storm wind forces are applied to the structure. The large head fasteners may be standard carriage bolt type fasteners or other standard head bolts with washer devices to effectively enlarge the bearing surface of the head of the fastener.

Referring to FIG. 8 and again to FIGS. 1-3, the roof decking system 82 as defined by the subject invention provides an improved method of covering and sealing roof decking 114 such as sheets of plywood of the structure prior to applying additional façade or other cosmetic coverings such as shingles, metal, et cetera. A watertight tape seal 116 applied over seams 118 at mating edges of roof decking 114 helps to provide a watertight seal. The roof decking system 82 provides an improved fastening means via nails and/or screws and/or a specific patterned array application of the fasteners so as to securely retain the decking 114 attached to the rafters and/or joist structure.

Figure 9:
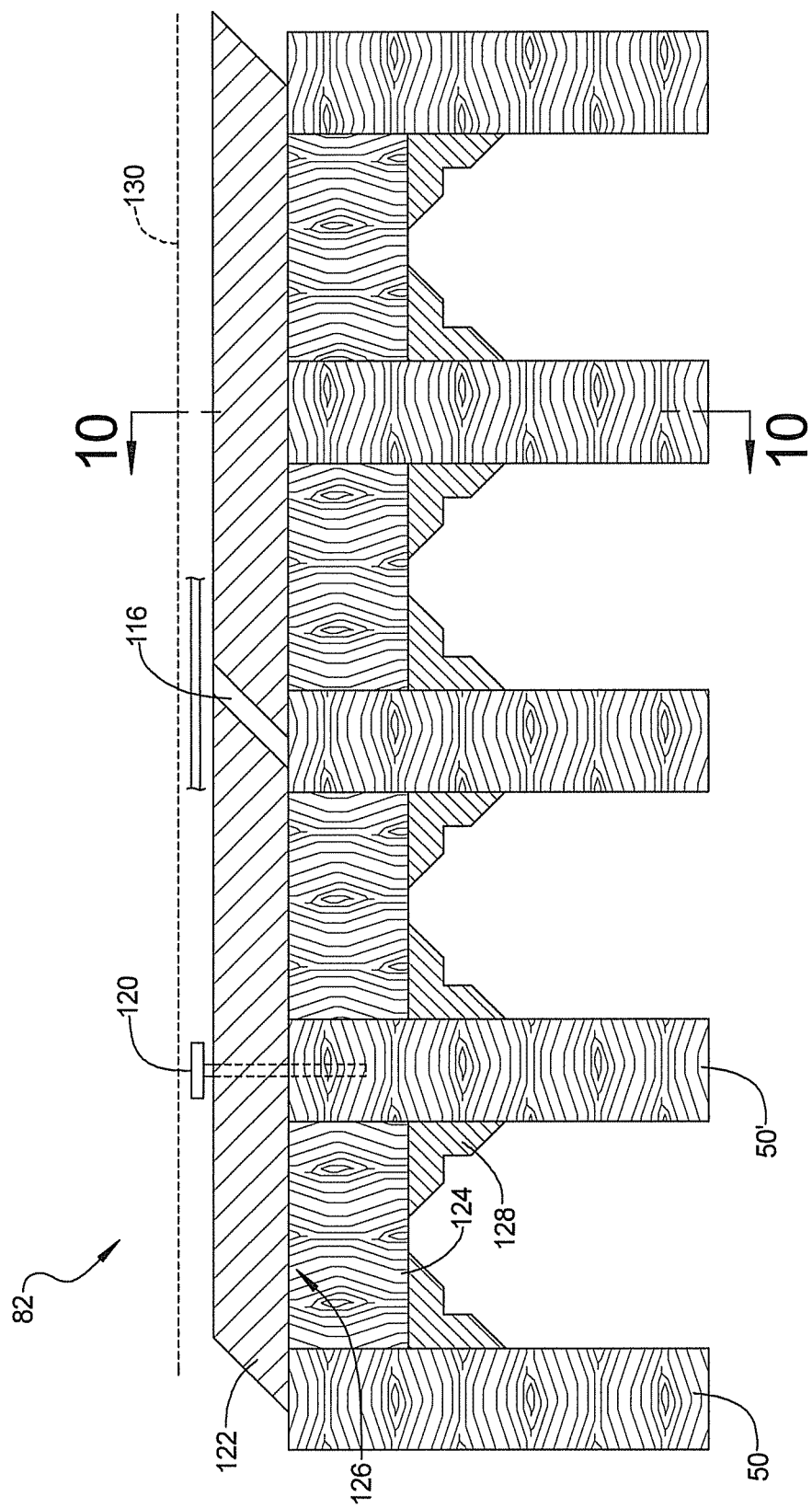
FIG. 9 is a front elevational view of the roof decking system of FIG. 8.

Referring to FIG. 9 and again to FIGS. 1-3 and 8, according to one preferred embodiment of the subject invention, a specialized fastener 120 has a relatively large head and specialized retention features so as to provide improved retention of the decking to the rafters and/or joist. Another preferred embodiment of the subject invention features the decking 114 to be tongue & grooved so as to provide a watertight seal via interlaced edges of the decking. A further preferred embodiment of the decking 114 features a shiplap edge 122 which presents a watertight sealed edge on a bias cut. Yet another preferred embodiment of the decking includes lineup blocking 124 between adjacent rafters 50, 50' and located under the edges 126 of adjacent decking 114 so as to provide a secure fastening surface for the entire edge 126 of the decking 114. The lineup blocking 124 also provides an effective sealing surface under the edge of adjacent sheets of decking 114 and prevents relative deflection at the mating edges of adjacent sheets of decking. The lineup blocking 124 also provides proper alignment and spacing between rafters 50, 50' while at the same time providing resistance to torsion and rhombus forces acting on the rafters and joist. The lineup blocking 124 also defines a continuous line of compression blocks installed between juxtaposed rafters and/or joist to prevent lateral collapse of the structure.

Those skilled in the art will also recognize that alternative fastening methods exist for attaching the roof decking to the rafters and/or truss elements. Another alternative includes the use of a standard screw type fastener. A further method for fastening the roof decking includes any one of several nails in specialized patterns. Still another fastening method includes using a specialized nail with spiral shapes upon it that in essence function like a screw that has been driven into place like a nail. Any of these fastening methods will satisfy the spirit of securing the roof decking directly to the rafters and/or truss roof elements. It will also be appreciated that the fasteners may require a large head and/or a washer device to prevent the head of the fastener from pulling through the decking when storm wind forces are applied to the structure. The large head fasteners may be standard screw or nail type fasteners or other standard fasteners with washer devices to effectively enlarge the bearing surface of the head of the fastener.

One preferred embodiment of the lineup blocking 124 features a bracket 128 which can be either preassembled to the ends of the lineup block 124 or installed after the lineup block 124 is installed. The bracket 128 provides additional ease of assembly and additional structural integrity to the rafters 50 and decking 114. Another preferred application of the subject invention employs the respective features of a watertight membrane 130 placed over the decking 114 and/or the watertight seal tape 116 covering over the mating edges of adjacent sheets of decking 114, including ridges and valleys.

Referring to FIG. 9 and again to FIGS. 1-8, a cross section through one preferred embodiment of the roof decking system 82 shows shiplap edges, lineup blocks 124, lineup block brackets 128, decking fasteners 120, tape-seals 116 at joints, and the watertight membrane 130. The roof decking system 82 provides a secondary water seal for the roof to resist rain and blowing rain in the event that the primary covering and weather seal façade is compromised and/or lost during storm winds subjected upon the structure. The subject invention effectively unitizes the entire roof construction by employing the roof decking system 82 to cooperate and integrate with the respective features of the wall reinforcement system 34, the wind beam system 80, the rafter/joist tie-down system 66, the roof decking system 82, the venting system 84, the diaphragm reinforcement system 70, and/or the safe room system 72.

Figure 10:
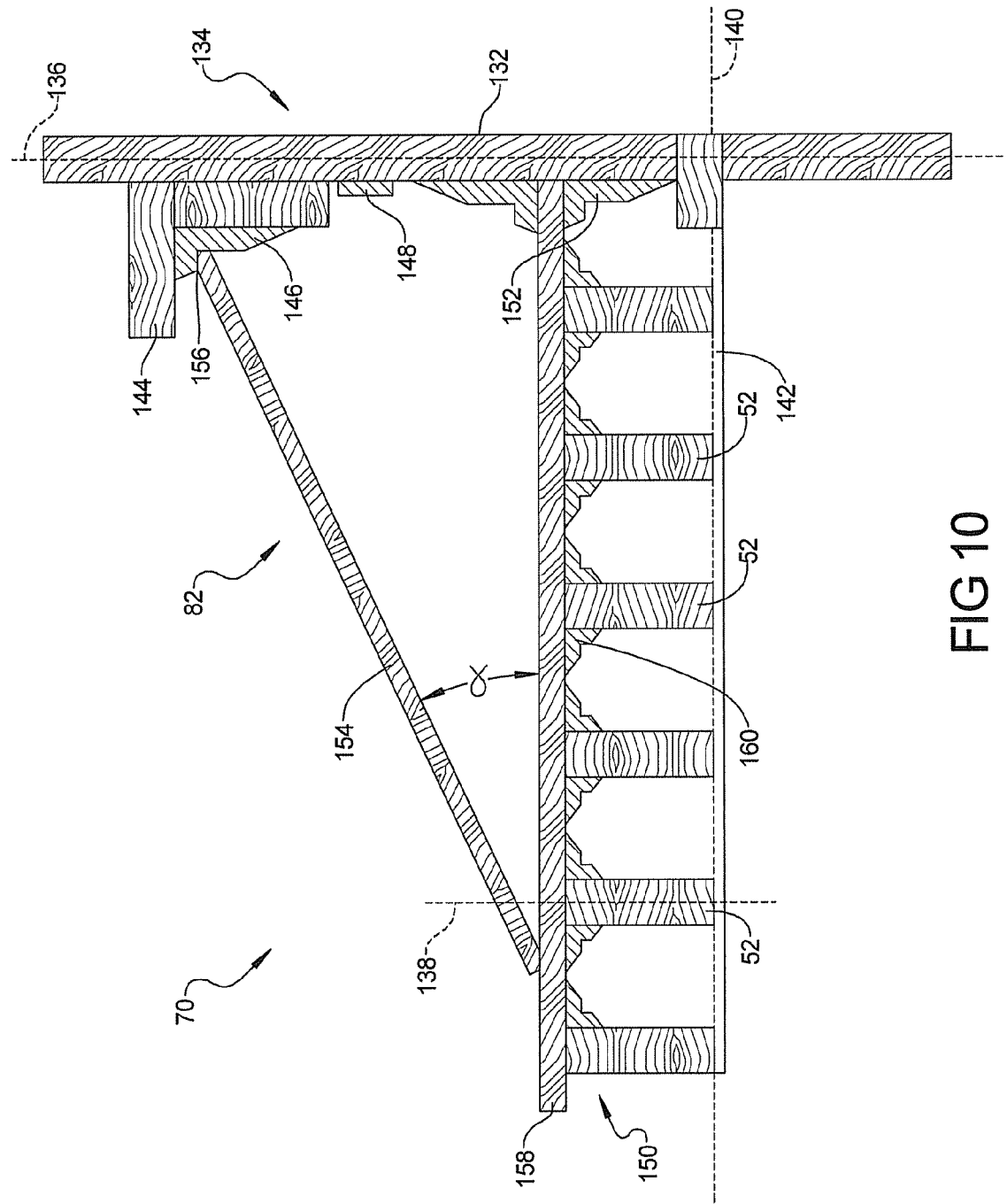
FIG. 10 is a cross sectional end elevational view taken at section 10 of FIG. 9.

Referring to FIG. 10, the diaphragm reinforcement system 70 as defined by the subject invention addresses several diaphragm problems commonly associated with residential and commercial construction. One common diaphragm problem is gable ends of construction wherein for instance a triangle shaped wall gable end 132 is formed enclosing one end of a roof system 134. The gable end 132 forms a gable end plane 136 inside the triangle frame of the gable end 132 which is susceptible to being either blown in or sucked out in response to storm winds. Another common diaphragm problem is a joist plane 138 formed by any one of several rafter/joist/truss components such as joists 52 shown, juxtaposed in array adjacent to the gable end 132 of the roof construction. The joist plane 138 is susceptible to being warped and/or wrenched and/or twisted and/or laterally shifted in response to storm wind forces. Yet another common diaphragm problem is a ceiling plane 140 formed by a ceiling 142 on the underside of the juxtaposed array of joists 52. The ceiling plane 140 is susceptible to warping and flexing due to the joist plane 138 responding to storm winds acting on the structure.

The subject invention overcomes the problems associated with these diaphragms by employing the diaphragm reinforcement system 70. One preferred embodiment of the diaphragm reinforcement system 70 features a pearling brace 144 spanning transverse across the gable end 132. The pearling brace 144 in one preferred embodiment provides a series of specialized brackets 146 which cooperate with standard wood components to enhance the structural integrity of the gable end plane 136. In another preferred pearling embodiment, a structural metal beam 148 and associated brackets span transversely across the gable end 132 to enhance the structural integrity of the gable end plane 136. Another preferred embodiment of the diaphragm reinforcement system 70 features a series of joist brace elements 150 spanning transversely across the array of juxtaposed joists 52 so as to enhance the structural integrity of the joist array to prevent them from being negatively affected by storm force winds.

The joist brace elements 150 are firmly affixed to the joist 52 such that the joist 52 is not only prevented from suffering detrimental joist plane 138 deformation but also preventing detrimental ceiling plane 140 deformation. The joist brace elements 150 are firmly anchored to specialized gable end brackets 152 at the gable end 132 which in turn are directly anchored to the wall reinforcement system 34 components, which in turn anchor the entire construction to the foundation elements. The joist brace elements 150 also include strut elements 154 attaching at one end to the joist brace elements 150 and then spanning at a bias angle α up to a connection point 156 on the pearling brace 144. The strut 154 forms the hypotenuse of a triangle comprised of the strut 154, the gable end plane 136, and a joist brace 158 element, which subsequently forms an enhanced structural means to impart structural integrity to the diaphragms aforementioned which were previously unattainable prior to the subject invention. One or more joist brace brackets 160 which connect the joist brace 158 to the joists 52 also define members of the joist brace elements 150.

With continuing reference to FIG. 10, the gable end plane 136, the ceiling plane 140, and the joist plane 138 are simultaneously structurally enhanced via the collective features of the gable end bracket 152, the joist brace bracket 160, the joist brace 158, the strut 154, and the pearling brace 144. As a result, the entire set of diaphragms are effectively unitized together and integrated into a larger unitized system of structural integrity to maintain a watertight seal system for the construction when subjected to storm wind forces. The subject invention effectively unitizes the diaphragm reinforcement system 70 by employing and integrating the respective features of the anchoring system 10, the wall reinforcement system 34, the rafter/joist tie-down system 66, the wind-beam system 80, the wall sheeting system 68, the venting system 84, and/or the safe room system 72.

Referring to FIG. 11, according to one preferred embodiment of the venting system 84, an internal access vent 162 enables air to pass from the conditioned air space defining a living portion 164 of the structure and slightly conditions the air in a roof space 166, wherein a closed cell spray foam 168 insulates and seals the entire underside of a roof system 170 and gable ends 132 to prevent water leaks. The venting system 84 as defined by the subject invention provides a solution for maintaining appropriate thermal conditions for the air in the roof space 166 of a structure so that appropriate air changes and/or conditioning occur in the roof space 166. Typical venting methods include a series of external access vents, such as under eve soffit vents, gable vents, ridge vents, turbines, and louvers, many of which come in passive or powered variations.

A significant problem that basically all known external access venting systems suffer is that they are susceptible to being damaged and/or completely removed during blowing rain in wind storm conditions, which lead to water leaks and subsequent damage. Another significant problem that basically all prior art external access venting systems suffer is that, even if they manage to stay intact during the wind storm conditions, they are further susceptible to allowing blowing rain in wind storm conditions to pass through them and into the roof space, which leads to water leaks and subsequent damage. Therefore, one preferred embodiment of the venting system 84 of the subject invention provides specialized external venting devices for influent and effluent air handling which are able to remain firmly and functionally intact and at the same time control and mitigate blowing rain during wind storm conditions such that water is channeled and/or redirected and/or drained back out of the structure, preventing damaging accumulation inside the structure.

Another preferred embodiment of the subject invention eliminates all external access vents so as to eliminate the problems with any such locations and/or associated venting devices, and replaces them with the small, appropriately sized internal access vents 162 directly connecting the conditioned portion of the structure to the roof space to slightly "condition" the air in the roof space. There is, therefore, no external access vents communicating between the internal conditioned portion of the building structure to ambient air outside the building structure. The conditioned air in the roof space 166 is both appropriately cooled and/or heated in conjunction with the seasons of the year to maintain a moderate temperature range in the roof space 166. The conditioned air in the roof space 166 is further enabled by having no influent or effluent outside air to influence the roof space 166; however, an efficient insulation sealing system, such as the closed cell spray foam 168, is applied to the entire underside of the roof construction to fill in between the rafters 50 to provide an air and water seal to prevent air and water from penetrating the roof construction into the roof space 166. The closed cell spray foam 168 insulation also covers and seals any fasteners of the decking 114 or shingles 172 or other exterior construction that might have penetrated through the decking 114 and into the roof space 166, such that any chance of becoming a future leak path is prevented. The closed cell spray foam 168 insulation also covers walls 174 of the gable ends 132 in the same manner. The subject invention effectively cooperates with a unitized roof construction by employing the venting system 84 to cooperate and integrate with the respective features of the roof decking system 82, the wind beam system 80, the rafter/joist tie-down system 66, and the diaphragm reinforcement system 70.

Referring to FIG. 12, one preferred embodiment of the window/door protective system 112 provides for a typical widow 176 for residential structures which is fitted with installed decorative cover mounts 178 such that a removable protective cover 180 securely fastens to the cover mounts 178. The window/door protective system 112 as defined by the subject invention provides the protective cover 180 over windows 176 to minimize the likelihood of breakage during wind storms. One preferred embodiment of the window/door protective system 112 is comprised of a series of brackets 182 and mounting hardware designed to securely establish a robust attachment to the structure 184 and receives an appropriate protective cover 180 designed to fit into and cooperate with the mounted protective cover brackets 182. The protective covers 180 can be stored until required to prepare for an oncoming wind storm. The mounted brackets 182 will remain mounted to the structure 184 and designed to be reasonably decorative. Another preferred embodiment of the subject invention features a similar protective cover 186 over doors 188 and/or installed inside of exterior doors to prevent them from blowing in or being sucked outward during storm winds. Another preferred embodiment of the subject invention features a protective cover over garage doors (not shown) to prevent them from blowing in or being sucked outward during storm winds. The subject invention employs the window/door protective system 112 to cooperate and integrate with the respective features of the wall reinforcement system 34 and/or the safe room system 72.

Referring to FIG. 13, a preferred embodiment of the storm safe room 72 provides an independent unitized room 190 constructed and fitted with a storm door 192 and an air vent 194 positioned inside the building structure. Another preferred embodiment of the subject invention features a storm safe room system 72 which is prefabricated from appropriate enhanced components and delivered to the construction site, and then installed so the building 196 can be constructed around it. The storm safe room system 72 as defined by the subject invention provides enhanced construction components for a self-contained storm safe room which is firmly and strongly anchored to the foundation and/or slab of the structure. The enhanced construction components include those featured in the wall reinforcement system 34, the anchor system 10, the rafter-joist tie-down system 66, the wind beam system 80, door/window protective seal system 112, and/or the roof decking system 82, all combined together to establish a unitized structure to function as an appropriate storm safe room system 72.

Another preferred embodiment of the storm safe room system 72 includes an independent unitized roof 198, reinforced walls 200, and the storm door 192 which opens inward. The door features enhanced hinges 202 and locking and security components 204 to ensure closure in the event it is subjected to storm force winds, flying debris, and/or influent water. The storm safe room system 72 provides the independent fresh air vent 194 and the reinforced door 192 to prevent it from opening except at the command of the occupant and provides a watertight seal 206 to prevent influent water. The storm safe room system 72 provides a storm room suitable of being used as a dual purpose room, such as a closet, pantry, bathroom, or the like. One preferred embodiment of the subject invention features a storm safe room system 72 constructed on-site using appropriate enhanced components.

The subject invention effectively establishes a unitized storm safe room system 72 by cooperating and integrating with the respective features of the anchor system 10, the wall reinforcement system 34, the rafter/joist tie-down system 66, the window/door protective seal system 112, the roof decking system 82, the venting system 84, the wind-beam system 80, the diaphragm reinforcement system 70, and the wall sheeting system 68.

The present invention provides an improved system for a typical residential or commercial structure wherein a series of specialized components are integrated together so as to enhance the structural integrity of the structure against wind forces, such as those associated with hurricanes and/or tornados, so as to provide a secondary relatively watertight seal for the structure, even in the event that the primary sealing system of shingles and/or siding is compromised, damaged, or removed by the storm winds. As a result, known shingles and siding provide a cosmetic covering and a primary water seal for the structure; however, the present invention provides a secondary water seal in the event that the primary seal system is compromised during storm wind exposure.

The present invention further provides structural enhancements that can be applied to new construction as well as retrofitting existing structures so as to improve structural integrity and secondary sealing against wind forces such as those associated with hurricanes and/or tornados. The present invention further provides structural enhancements that cooperate with standard construction components so as to improve the structural integrity of the construction components beyond their original capabilities against wind forces, such as those associated with hurricanes and/or tornados, and further to provide a secondary sealing system to resist influent water in the event that the primary sealing system is compromised.

The typical preferred embodiment construction material for the structural enhanced components of the present disclosure is metal. The components may be manufactured from metal using any one of several typical methods such as stamping, forging, bending, welding, or combinations of fabrication methods. In addition, the components may be manufactured from non-metal materials such as plastic, reinforced plastic, fiberglass, composites, and/or any other appropriate technology materials suitable to provide the strength requirements for a given application.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A construction system to provide structural integrity for a building structure to withstand the destructive forces of storm winds and to minimize or prevent the influent of associated wind-driven blowing rain, comprising:

multiple subsystems connected to the building structure, the building structure including a wall structure having multiple studs and a roof structure having multiple components, including trusses or a combination of joists and rafters, the multiple subsystems including:

an anchoring system providing multiple sets of two anchor fasteners partially embedded in a foundation and having portions of the two anchor fasteners extending out of the foundation;

a wall reinforcement system having multiple structural columns individually positioned between proximate ones of the studs, the portions of the two anchor fasteners both connected to the structural column and the structural column oppositely connected to the roof structure such that the wall reinforcement system ties together the roof components and the wall structure to the foundation using the structural columns; and a wind-beam system having:

a wind-beam chord connector connected to one of the joists and to a kingpost extending transversely from and connected to the joist, the kingpost also connected to adjoining first and second rafters;

a wind-beam ridge connector connected to the adjoining first and second rafters and to the kingpost; and a wind-beam extension connecting the wind-beam chord connector to the wind-beam ridge connector independent of the kingpost.

2. The construction system of claim 1, wherein the wall reinforcement system further includes first and second anchor brackets individually connected to opposite ends of the structural columns.

3. The construction system of claim 1, wherein the multiple subsystems further include a rafter/joist tie-down system having a rafter tie-down extension connected to upper and lower chords of individual ones of the trusses.

4. The construction system of claim 1, wherein the multiple subsystems further include a rafter/joist tie-down system having multiple rafter tie-down extensions each connected to a rafter and to a joist of the roof structure and to one of the structural columns.

5. The construction system of claim 1, wherein the multiple subsystems further include a wall sheeting system having wall sheeting bolted to multiple ones of the structural columns.

6. The construction system of claim 1, wherein the multiple subsystems further include a roof decking system having a water resistant tape seal applied at each joint defined between adjacent ones of a plurality of roof decking members.

7. The construction system of claim 6, wherein each joint defined between adjacent ones of a plurality of roof decking members is a shiplap joint.

8. The construction system of claim 6, further including a lineup block positioned at each joint defined between adjacent ones of the plurality of roof decking members acting to reinforce the joint.

9. The construction system of claim 1, wherein the multiple subsystems further include a diaphragm reinforcement system acting to reinforce a gable end of the building structure, the diaphragm reinforcement system having a joist brace connected to multiple ones of the joists, a strut angularly oriented with respect to the joist brace, and a pearling brace connecting the strut to the gable end.

* * * * *